Patented Jan. 26, 1932

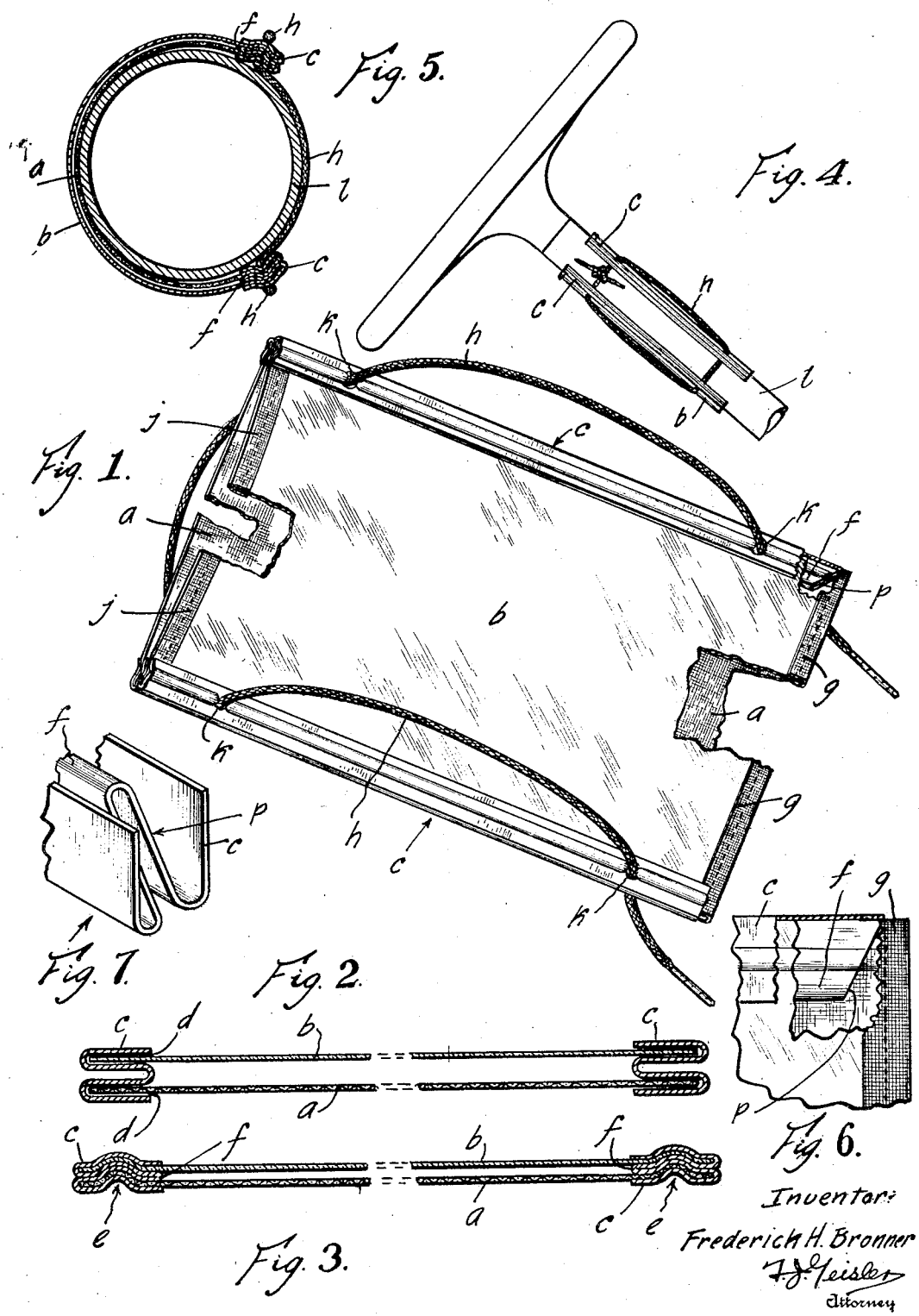

1,842,744

UNITED STATES PATENT OFFICE

FREDERICK H. BRONNER, OF PORTLAND, OREGON

FLEXIBLE CERTIFICATE HOLDER

Application filed September 22, 1930. Serial No. 483,597.

My invention relates to flexible certificate or card holders especially adapted to be used on automobiles for containing a certificate of registration or the like, which is required, in most States, to be displayed in plain view in the driver's compartment of the vehicle.

Heretofore various types of certificate holders have been used which, however, have consisted mostly of metallic frames adapted to be bolted or otherwise secured to the instrument board or some portion of the automobile body within the driver's compartment, but with the advent of metal constructed automobile bodies, this type of certificate holder has become impractical, since the latter can only be attached to the automobile by employing the services of a mechanic to bore holes in the metal body, which is inconvenient and mars the appearance of the automobile.

Therefore, the principal object of my invention is to provide a simple, neat appearing and inexpensive, yet durable, certificate holder adapted to be conveniently and readily fastened by simple means to some portion of the driver's compartment of the automobile, for example, the steering wheel column, whereby the finish of the driver's compartment need not be marred by unsightly holes which must be bored in the metal body for attaching the old type of holder.

I attain my objects by providing a certificate holder comprising a flexible rectangular fabric section and a transparent section bound together at the sides by metallic strips initially formed somewhat W-shaped in cross section, and in the recesses of which the fabric and transparent sections are respectively inserted, after which to clamp them in place, the metal strips are pressed together and locking grooves are pressed therein, thus not only forming a permanent binder, but the middle walls of the said recesses serve to space the fabric section and the transparent section sufficiently to receive the certificate. One end of the holder is closed by overlapping the fabric section onto the metallic section and stitching the same in place. By this construction, a flexible envelope is provided having a transparent face through which the certificate will be visible and which is adapted to be wrapped around the steering wheel column and secured by laces or other means such as springs or elastic bands passed through the said strips.

The combination of parts by which the above enumerated features are attained and the general construction and arrangement of my certificate holder are hereinafter fully described with reference to the accompanying drawings.

In the drawings:

Fig. 1 shows a perspective view of my certificate holder when fully assembled with portions broken away to disclose the details of construction;

Fig. 2 shows a transverse section through my holder before the metallic binding strips are pressed together and illustrates the mode of assembly of the same;

Fig. 3 shows in a similar section to Fig. 2 how the back section and transparent section are bound together when the said metallic strips are pressed together to form a permanent bond for the two sections;

Fig. 4 shows one method of attaching the same to the steering column of an automobile;

Fig. 5 shows a section taken on the line 5—5 of Fig. 4 and further illustrates how my certificate holder is arranged on the steering wheel column;

Fig. 6 shows in an enlarged fragmentary view one corner of my certificate holder and illustrates how the inner walls of the binding strips are cut back to prevent cutting the binding threads; and Fig. 7 shows an enlarged perspective view of one end of the binding strip, illustrating the same.

Referring now to the drawings, my certificate holder comprises a rectangular back section $a$ of fabric or other flexible material and a transparent section $b$ of celluloid or the like, which is also flexible.

The sections $a$, $b$ are bound together on the side edges by metallic binding strips $c$ initially formed W-shaped in cross section, see Fig. 2, thus providing companion longitudinal channels $d$ in which the side edges of the sections a, b are arranged, respectively, and then by pressing the metallic strips c together, see Fig. 3, and at the same time forming a locking groove e in them, the sections a, b are permanently and strongly bound together, but spaced apart by the double inner wall f of the companion recesses sufficiently to receive and accommodate a certificate whether it be formed of paper or cardboard.

One end of my holder is closed, see Fig. 1, by overlapping the edge g of the fabric section a on the transparent section b, and stitching or otherwise securing the same closely on the said section b, thus forming an envelope having a transparent face through which the certificate will be visible. A similar strip of fabric j is stitched across the section b at the open end to prevent the latter from breaking or tearing. By this construction a durable closure is provided since the fabric tends to protect the threads from tearing the celluloid.

Holes k are punched in the metallic strips c through which a lace h may be threaded, by which the holder may be conveniently and readily secured to the steering wheel column l of the automobile, as illustrated in Figs. 4 and 5.

While these fastening means are preferable, other means for fastening the certificate holder to the vehicle may be used equally well, such as springs or elastic tapes.

Further, the double inner walls f of the metallic strips c are cut back diagonally, as at p in Figs. 1, 6, and 7, to prevent the ends thereof, when they are pressed together, from cutting the threads by which the overlapped portion g of the back section is secured to the transparent section b.

Thus, I have provided an inexpensive and neat appearing certificate holder which displays the certificate, but protects it from dust and dirt and which is readily fastened in the driver's compartment of the vehicle without requiring that holes be bored in the metal frame or otherwise defacing the finish of the vehicles.

I claim:

1. A flexible certificate holder comprising, a fabric back section and a transparent front section, metallic W-shaped strips for binding the sides of said sections together, said strips having companion longitudinal recesses in which the side edges of said sections are respectively inserted, the sides of said strips being pressed together, whereby the sections are bound together, but spaced apart the thickness of a certificate by the inner walls of said recesses, and a longitudinal locking groove formed in each of said strips, whereby a flexible envelope is provided adapted to receive the certificate.

2. A flexible certificate holder comprising a fabric back section and a transparent front section, metallic W-shaped strips for binding the sides of said sections together, said strips having companion longitudinal recesses in which the side edges of said sections are respectively inserted, the sides of said strips being pressed together, whereby the sections are bound together, but spaced apart the thickness of a certificate by the inner walls of said recesses, a longitudinal locking groove formed in each of said strips, whereby a flexible envelope is provided adapted to receive the certificate, and laces carried by said metallic strips for fastening the holder to a vehicle.

3. A flexible certificate holder comprising, a fabric back section and a transparent front section, metallic W-shaped strips for binding the sides of said sections together, said strips having companion longitudinal recesses in which the side edges of said sections are respectively inserted, the sides of said strips being pressed together, whereby the sections are bound together, but spaced apart the thickness of a certificate by the inner walls of said recesses, and the inner walls of said recesses terminating at one end of the holder at an oblique angle with the adjacent ends of the outer walls, and a longitudinal locking groove formed in each of said strips, whereby a flexible envelope is provided adapted to receive the certificate.

4. A flexible certificate holder comprising a fabric back section and a transparent front section, metallic W-shaped strips for binding the sides of said sections together, said strips having companion longitudinal recesses in which the side edges of said sections are respectively inserted, the sides of said strips being pressed together, whereby the sections are bound together, but spaced apart the thickness of a certificate by the inner walls of said recesses, a longitudinal locking groove formed in each of said strips, one end of said sections secured together by overlapping the end of the fabric sections on the transparent section and stitching the same together, whereby a flexible envelope is provided adapted to receive the certificate, and means carried by said metallic strips for fastening the holder to a vehicle.

FREDERICK H. BRONNER.